H. P. C. BROWNE.
HUB ODOMETER.
APPLICATION FILED NOV. 4, 1907.
942,883.
Patented Dec. 14, 1909.
2 SHEETS—SHEET 1.
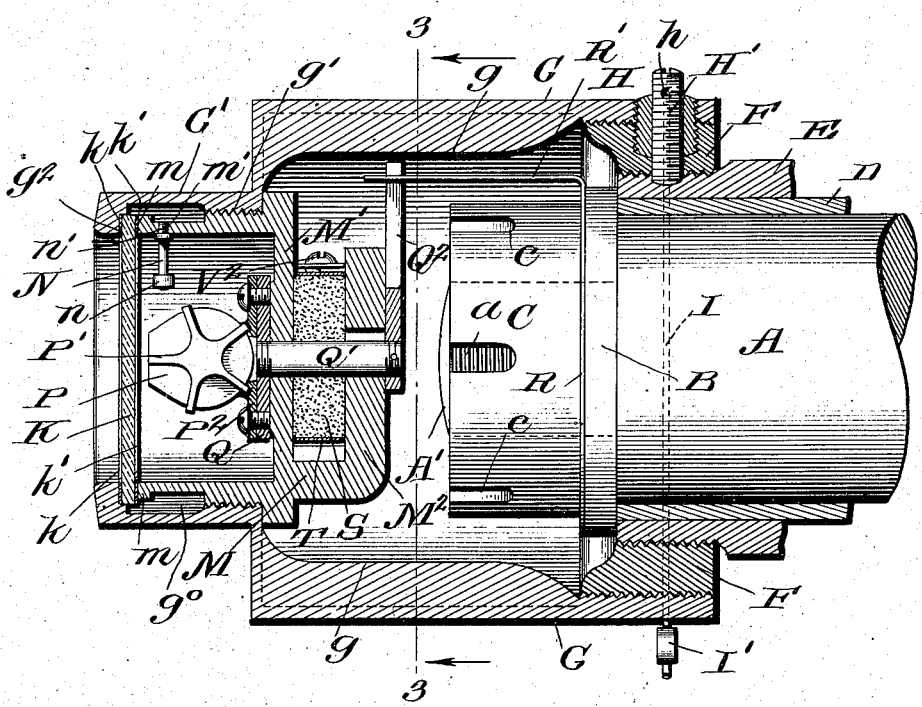
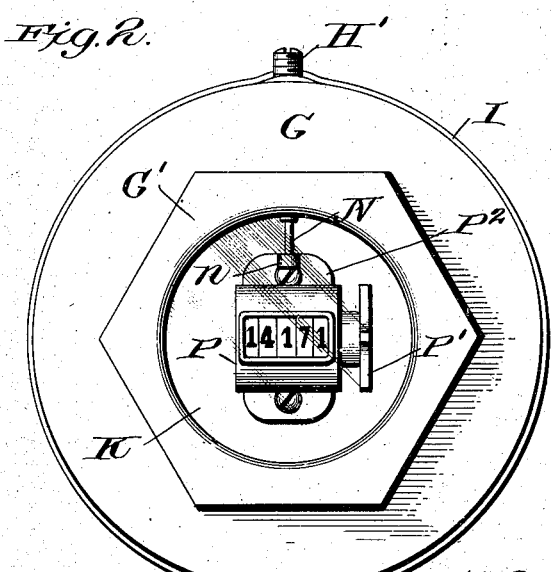

H. P. C. BROWNE.
HUB ODOMETER.
APPLICATION FILED NOV. 4, 1907.
942,883.
Patented Dec. 14, 1909.
2 SHEETS—SHEET 2.
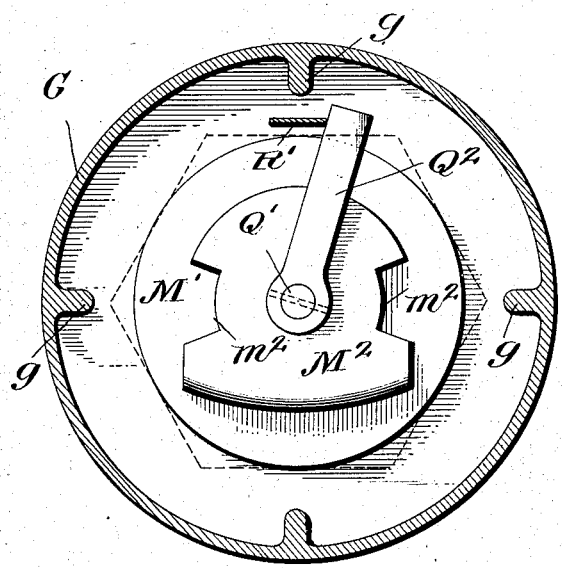
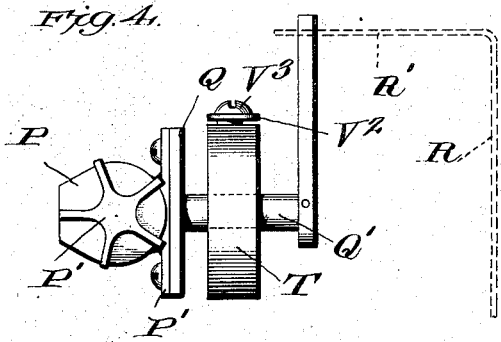
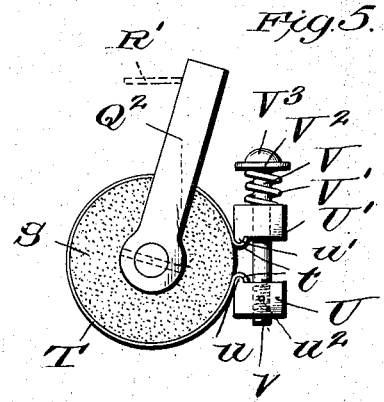
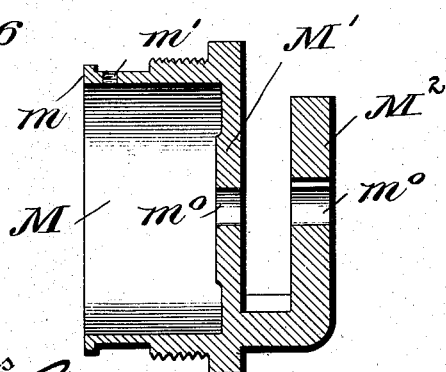
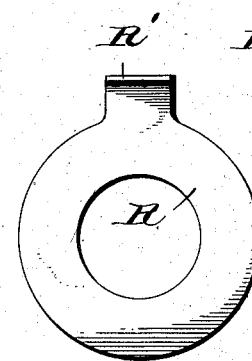
Inventor
H. P. C. Browne,
Witnesses

UNITED STATES PATENT OFFICE.

HARRY P. C. BROWNE, OF NEW YORK, N. Y.

HUB-ODOMETER.

942,883.  Specification of Letters Patent.  Patented Dec. 14, 1909.

Application filed November 4, 1907. Serial No. 400,605.

*To all whom it may concern:*

Be it known that I, HARRY PATRICK CONNOLLY BROWNE, a citizen of the United States, residing at New York, in the county and State of New York, have invented certain new and useful Improvements in Hub-Odometers; and I do hereby declare the following to be a full, clear, and exact description of the invention, such as will enable others skilled in the art to which it appertains to make and use the same.

My present invention relates to improvements in hub odometers, and is intended to provide a simple and effective device, which may be readily attached to or removed from the hub of a vehicle, and which is not liable to get out of order, and which is simple in construction and operation.

My invention is especially intended to provide a simplified and improved apparatus over that shown in my Patent No. 827,614, granted July 31, 1906, and entitled revolution counter.

My invention will be understood by reference to the accompanying drawings, in which the same parts are indicated by the same letters throughout the several views.

Figure 1 shows a central vertical section through the hub cap and a portion of the hub, the axle of the vehicle being shown in elevation. Fig. 2 is an end view of the device shown in Fig. 1, as seen from the left of said figure. Fig. 3 shows a section along the line 3—3 of Fig. 1, and looking in the direction of the arrows. Fig. 4 is a detail showing the cyclometer, with its supporting spindle and packing in elevation. Fig. 5 is a detail showing the packing for the cyclometer spindle with the arm for holding same against rotation. Fig. 6 is a detail showing a section of the housing for the spindle and packing. Fig. 7 shows the washer and arm for holding the spindle against turning.

A represents the bearing portion of the shaft or axle, which is reduced, as at A′, and is screw threaded, as at $a$. Over the reduced portion A′, the washer B is mounted, which is held in place by the screw-cap C, which is slotted, as at $c$, to engage a spanner wrench for assembling.

D represents a cylindrical bearing bushing, mounted between the axle A and the hub E. Screwed on the hub E is the ring F, which has outer screw-threads to engage the cap or housing G. The bushing F and housing G are connected together by a hollow screw H, into which is screwed a locking screw H′, see Fig. 1, and the parts are still further locked by a wire I, which passes through the hole $h$ in the pin H′, and has its opposite ends connected to a lead seal I′. The housing G is preferably stiffened by ribs $g$, and its outer end is made hexagonal, as at G′, and internally screw-threaded, as at $g'$, to engage the hollow cyclometer supporting piece M. This piece M is substantially in the form of a hollow cylinder with a closed end M′ and a rear plate or lug M², both perforated as at $m^o$. The open end of this cylinder M, has a shoulder $m$, which presses against a packing washer $k'$, on one side of the glass window K, and the other side of the glass window is provided with a similar washer $k$, engaging the shoulder $g^2$ of the housing, and thus a substantially dust-tight joint is provided. The supporting piece M is provided with a screw-threaded opening $m'$ to receive the screw end $n'$ of the striker N, which carries a roller $n$ adapted to engage the teeth of the star wheel P′ of the cyclometer P, as the piece M revolves. This cyclometer is mounted on a plate P² screwed to the plate Q, connected to the spindle Q′, carrying the arm Q², which is held against turning through a complete cycle by the arm R′, of the washer R, which is held between the cap C and the washer B. Thus, said arm R, being held by the fixed shaft A, prevents the rotation of the spindle Q′ carrying the cyclometer.

The interior of the housing G is filled with oil, and to prevent this from leaking into the cyclometer chamber, suitable packing is required. I prefer a plastic packing composed of asbestos fiber, treated with wax or tallow, as shown at S in Fig. 1, and this plastic packing is held within a spring T, the ends of which $t$ are connected, respectively, to the nut U and the block U′, as by means of the lugs $u$ and $u'$, respectively. The nut U is adapted to engage the screw-threaded end $v$ of the pin V, and is locked in the desired position by the set-screw $u^2$. This pin is free to rotate in the block U′, and is provided with a washer V², which engages the spring V', and by screwing on the head V³ of the said screw, the compression of the spring V' may be adjusted, and thus the requisite pressure may be applied to the plastic packing S. This packing being pressed inwardly will, of course, expand against the side walls on the parts M' and M² of the packing chamber of the supporting piece M, and thus the spring will keep the packing tight and automatically adjust the same for wear. The part M² of the piece M is notched as at $m^2$ (see Fig. 3) to facilitate the use of a spanner in assembling and disassembling the parts.

From an examination of Fig. 4, it will be noted that the cyclometer spindle Q' is held against rotation while the hub revolves, causing the roller $m$, at each revolution, to strike one tooth of the cyclometer star wheel, and thus to indicate the revolutions of the hub E.

The end G' of the cap G is preferably provided with a recess $g^6$, so that the outer shell will yield to blows, or be dented, without deformation of the inclosed supporting piece M; and therefore the outer part of the hub cap may be struck quite a violent blow without damaging the cyclometer arrangement inclosed therein.

It will be noted that the plastic packing herein described and shown imposes no load upon the spindle bearing, since the pressure is always inward toward the spindle and is balanced.

It will be obvious that the housing G with its contents, may be very conveniently attached to or removed from the hub, and that access to the various parts may be readily had, without the use of any other tools than an ordinary wrench and screw-driver.

It will be obvious that various modifications might be made in the herein-described apparatus which could be used without departing from the spirit of my invention.

Having thus described my invention, what I claim and desire to secure by Letters Patent of the United States, is:—

1. In a hub-odometer, the combination with a fixed axle and a rotating hub of a hollow housing mounted over the end of said hub and axle, a supporting piece secured in said hollow housing, a spindle pivoted in said supporting piece, a cyclometer carried by said spindle, an arm also carried by said spindle, and a second arm held against rotation and engaging the first arm, substantially as described.

2. In a hub-odometer, the combination with a fixed axle and a rotating hub of a hollow housing mounted over the end of said hub and axle, a hollow supporting piece secured in said hollow housing, a spindle pivoted in said supporting piece, a cyclometer carried at the end of said spindle, and inclosed in said supporting piece, an arm carried at the other end of said spindle, and a second arm mounted on the axle and engaging the first arm, substantially as described.

3. In a hub-odometer, the combination with a fixed axle and a rotating hub of a hollow housing mounted over the end of said hub and axle, a supporting piece secured in said hollow housing, a spindle pivoted in said supporting piece, a cyclometer carried by said spindle, an arm also carried by said spindle, a second arm held against rotation and engaging the first arm, a plastic packing mounted over said spindle, and means for compressing said packing, substantially as described.

4. In a hub-odometer, the combination with a fixed axle and a rotating hub of a hollow housing mounted over the end of said hub and axle, a supporting piece secured in said hollow housing, a spindle pivoted in said supporting piece, a cyclometer carried by said spindle, an arm also carried by said spindle, and a second arm held against rotation and engaging the first arm, a plastic packing mounted over said spindle, a hoop shaped spring inclosing the packing, and means for adjusting the compression of said spring, substantially as described.

5. In a hub-odometer, the combination with a fixed axle and a rotating hub of a hollow housing mounted over the end of said hub and axle, a hollow supporting piece secured in said hollow housing, a spindle pivoted in said supporting piece, a cyclometer carried by one end of said spindle, and inclosed in said supporting piece, an arm carried by the other end of said spindle, a second arm mounted on the axle and engaging the first arm, a plastic packing mounted over said spindle, and resilient means for compressing said packing, substantially as described.

6. In a hub-odometer, the combination with a fixed axle and a rotating hub of a hollow housing mounted over the end of said hub and axle, a hollow supporting piece secured in said hollow housing, a spindle pivoted in said supporting piece, a cyclometer carried by one end of said spindle, and inclosed in said supporting piece, an arm carried by the other end of said spindle, a second arm mounted on the axle and engaging the first arm, a plastic packing mounted over said spindle, a hoop shaped spring inclosing the packing, a second spring normally bearing on said first spring, and means for adjusting the compression of said second spring, substantially as described.

7. In a hub-odometer, the combination with the fixed axle and a rotating hub of a hollow housing mounted over the end of said hub and axle, a supporting piece secured in said hollow housing, provided with a recess with parallel walls, a spindle pivoted in said supporting piece and projecting through said walls, a cyclometer carried by said spindle, an arm also carried by said spindle, and a second arm held against rotation and engaging the first arm, a plastic packing mounted over said spindle, between said parallel walls, and means for compressing said packing, substantially as described.

8. In a hub-odometer, the combination with the fixed axle and a rotating hub of a hollow housing mounted over the end of said hub and axle, a supporting piece secured in said hollow housing, provided with a recess with parallel walls, a spindle pivoted in said supporting piece and projecting through said walls, a cyclometer carried by said spindle, an arm also carried by said spindle, and a second arm held against rotation and engaging the first arm, a plastic packing mounted over said spindle, between said parallel walls, a hoop shaped spring inclosing the packing, and means for adjusting the compression of said spring, substantially as described.

9. In a hub-odometer, the combination with the fixed axle and a rotating hub of a hollow housing mounted over the end of said hub and axle, a supporting piece secured in said hollow housing, provided with a recess with parallel walls, a spindle pivoted in said supporting piece and projecting through said walls, a cyclometer carried by said spindle, an arm also carried by said spindle, and a second arm held against rotation and engaging the first arm, a plastic packing mounted over said spindle, between said parallel walls, a hoop shaped spring inclosing the packing, and means for adjusting the compression of said spring, comprising a coil spring and an adjusting screw, substantially as described.

10. In a hub-odometer, the combination with a fixed axle and a rotating hub of a hollow housing mounted over the end of said hub and axle, a supporting piece secured in said hollow housing, a spindle pivoted in said supporting piece, a cyclometer carried by said spindle, a striker carried by said supporting piece and actuating said cyclometer, an arm also carried by said spindle, and a second arm held against rotation and engaging the first arm, substantially as described.

11. In a hub-odometer, the combination with a fixed axle and a rotating hub of a hollow housing mounted over the end of said hub and axle, a hollow supporting piece secured in said hollow housing, a spindle pivoted in said supporting piece, a cyclometer carried at the end of said spindle, and inclosed in said supporting piece, a striker carried by and projecting into said hollow supporting piece and actuating said cyclometer, an arm carried at the other end of said spindle, and a second arm mounted on the axle and engaging the first arm, substantially as described.

12. In a hub-odometer, the combination with a fixed axle and a rotating hub of a hollow housing mounted over the end of said hub and axle, a supporting piece secured in said hollow housing, a spindle pivoted in said supporting piece, a cyclometer carried by said spindle, a striker carried by said supporting piece and actuating said cyclometer, an arm also carried by said spindle, a second arm held against rotation and engaging the first arm, a plastic packing mounted over said spindle, and means for compressing said packing, substantially as described.

13. In a hub-odometer, the combination with a fixed axle and a rotating hub of a hollow housing mounted over the end of said hub and axle, a supporting piece secured in said hollow housing, a spindle pivoted in said supporting piece, a cyclometer carried by said spindle, a striker carried by said supporting piece and actuating said cyclometer, an arm also carried by said spindle, and a second arm held against rotation and engaging the first arm, a plastic packing mounted over said spindle, a hoop shaped spring inclosing the packing, and means for adjusting the compression of said spring, substantially as described.

14. In a hub-odometer, the combination with a fixed axle and a rotating hub, of a hollow housing mounted over the end of said hub and axle, a hollow supporting piece secured in said hollow housing, a spindle pivoted in said supporting piece, a cyclometer carried by one end of said spindle, and inclosed in said supporting piece, a striker carried by and projecting into said hollow supporting piece and actuating said cyclometer, an arm carried by the other end of said spindle, a second arm mounted on the axle and engaging the first arm, a plastic packing mounted over said spindle, and resilient means for compressing said packing, substantially as described.

15. In a hub-odometer, the combination with a fixed axle and a rotating hub of a hollow housing mounted over the end of said hub and axle, a hollow supporting piece secured in said hollow housing, a spindle pivoted in said supporting piece, a cyclometer carried by one end of said spindle, and inclosed in said supporting piece, a striker carried by and projecting into said hollow supporting piece and actuating said cyclometer, an arm carried by the other end of said spindle, a second arm mounted on the axle and engaging the first arm, a plastic packing mounted over said spindle, a hoop shaped spring inclosing the packing, a second spring normally bearing on said first spring, and means for adjusting the compression of said second spring, substantially as described.

16. In a hub-odometer, the combination with the fixed axle and a rotating hub of a hollow housing mounted over the end of said hub and axle, a supporting piece secured in said hollow housing, provided with a recess with parallel walls, a spindle pivoted in said supporting piece and projecting through said walls, a cyclometer carried by said spindle, a striker carried by said supporting piece and actuating said cyclometer, an arm also carried by said spindle, and a second arm held against rotation and engaging the first arm, a plastic packing mounted over said spindle, between said parallel walls, and means for compressing said packing, substantially as described.

17. In a hub-odometer, the combination with a fixed axle and a rotating hub of a hollow housing mounted over the end of said hub and axle, a supporting piece secured in said hollow housing, provided with a recess with parallel walls, a spindle pivoted in said supporting piece and projecting through said walls, a cyclometer carried by said spindle, a striker carried by said supporting piece and actuating said cyclometer, an arm also carried by said spindle, and a second arm held against rotation and engaging the first arm, a plastic packing mounted over said spindle, between said parallel walls, a hoop shaped spring inclosing the packing, and means for adjusting the compression of said spring, substantially as described.

18. In a hub-odometer, the combination with a fixed axle and a rotating hub of a hollow housing mounted over the end of said hub and axle, a supporting piece secured in said hollow housing, provided with a recess with parallel walls, a spindle pivoted in said supporting piece and projecting through said walls, a cyclometer carried by said spindle, a striker carried by said supporting piece and actuating said cyclometer, an arm also carried by said spindle, and a second arm held against rotation and engaging the first arm, a plastic packing mounted over said spindle, between said parallel walls, a hoop shaped spring inclosing the packing, and means for adjusting the compression of said spring, comprising a coil spring and an adjusting screw, substantially as described.

19. A hub-odometer comprising a hollow housing, means for attaching same to the hub, comprising a bouching ring, having interior and exterior screw threads engaging corresponding threads on the hub and housing, respectively, with means for locking said bouching to said hub and to said housing, a hollow supporting piece closing the outer end of said housing, a cyclometer casing and cyclometer mounted in said hollow supporting piece, a striker carried by and projecting into said supporting piece and actuating said cyclometer, and means for holding the cyclometer casing against rotating with said supporting piece, substantially as described.

20. A hub-odometer comprising a hollow housing, means for attaching same to the hub, comprising a bouching ring, having interior and exterior screw threads engaging corresponding threads on the hub and housing, respectively, with means for locking said bouching to said hub and to said housing, said means consisting of a compound screw, a hollow supporting piece closing the outer end of said housing, a cyclometer casing and cyclometer mounted in said hollow supporting piece, a striker carried by and projecting into said supporting piece and actuating said cyclometer, and means for holding the cyclometer casing against rotating with said supporting piece, substantially as described.

21. A hub-odometer comprising a hollow housing, means for attaching same to the hub, comprising a bouching ring, having interior and exterior screw threads engaging corresponding threads on the hub and housing, respectively, with means for locking said bouching to said hub and to said housing, said means consisting of a compound screw, with a wire passing through one member of said compound screw, and a seal normally locking the ends of said wire, a hollow supporting piece closing the outer end of said housing, a cyclometer casing and cyclometer mounted in said hollow supporting piece, a striker carried by and projecting into said supporting piece and actuating said cyclometer, and means for holding the cyclometer casing against rotating with said supporting piece, substantially as described.

22. In a hub odometer, the combination with an axle and a hub, of a cap mounted over the end of said hub and axle, a spindle journaled in said cap, a cyclometer carried by said spindle, and means for restraining the spindle against free rotation relative to the axle, substantially as described.

23. In a hub odometer, the combination with an axle and a hub, of a cap mounted over the end of said hub and axle, a spindle journaled in said cap, a cyclometer carried by said spindle, an arm carried by said spindle, and a second arm mounted on the axle and engaging the first arm, substantially as described.

24. In a hub odometer, the combination with a hub and an axle, of a cap mounted over the end of said hub and axle, a spindle journaled in said cap, a cyclometer carried by said spindle, means for restraining the spindle against free rotation relative to the axle, and means for preventing the passage of oil past the spindle, substantially as described.

25. In a hub odometer, the combination with a hub and an axle, of a cap mounted over the end of said hub and axle, a spindle journaled in said cap, a cyclometer carried by said spindle, actuating means for said cyclometer carried by the cap, and means for restraining the spindle against free rotation relative to said axle, substantially as described.

26. In a hub odometer, the combination with a hub and an axle, of a cap mounted over the end of said hub and axle, a closed chamber in said cap, a spindle journaled in said cap and extending into said chamber, a cyclometer carried by said spindle within said chamber, and means for restraining the spindle against free rotation relative to said axle, substantially as described.

27. In a hub odometer, the combination with a hub and an axle, of a cap mounted over the end of said hub and axle, a closed chamber in said cap, a spindle journaled in said cap and extending into said chamber, packing adapted to prevent the ingress of oil into the chamber, a cyclometer carried by the said spindle and inclosed within the said chambr, actuating means for said cyclometer carried by the cap, and means for restraining the said spindle against free rotation relative to said axle, substantially as described.

28. In a hub odometer, the combination with a hub and an axle, of a cap mounted over the end of said hub and axle, a spindle journaled in said cap, a cyclometer carried by said spindle, means for restraining said spindle from free rotation relative to said axle, a yielding packing for said spindle, and means for compressing said packing, substantially as described.

29. In a hub odometer, the combination with a hub and an axle, of a cap mounted over the end of said hub and axle, a spindle journaled in said cap, a cyclometer carried by said spindle, means for restraining said spindle from free rotation relative to said axle, a packing for said spindle, and spring-actuated means for compressing said packing, substantially as described.

30. In a hub odometer, the combination with a hub and an axle, of a cap mounted over the end of said hub and axle, a spindle journaled in said cap, a cyclometer carried by said spindle, means for restraining said spindle from free rotation relative to said axle, a yielding packing for said spindle, spring-acutated means for compressing said packing, and means for adjusting said spring, substantially as described.

31. In a hub odometer, the combination with a hub and an axle, of a cap mounted over the end of said hub and axle, a closed chamber in said cap, a spindle bearing pivoted in said cap, a spindle journaled in said bearing and extending into said chamber, means for restraining the said spindle against free rotation relative to the axle, yielding packing mounted around the spindle, restraining walls for said packing, and spring-actuated means for pressing said packing inwardly against the spindle and tending to extend it laterally against said walls, substantially as described.

32. In a hub odometer, the combination with a hub and an axle, of a cap mounted over the end of said hub and axle, a closed chamber in said cap, a spindle bearing pivoted in said cap, a spindle journaled in said bearing and extending into said chamber, means for restraining the said spindle against free rotation relative to the axle, yielding packing mounted around the spindle, restraining walls for said packing, and a hoop-shaped spring inclosing said packing and tending to press same inwardly, and to extend same laterally against said walls, substantially as described.

33. In a hub odometer, the combination with a hub and an axle, of a cap mounted over the end of said hub and axle, a closed chamber in said cap, a spindle bearing pivoted in said cap, a spindle journaled in said bearing and extending into said chamber, means for restraining the said spindle against free rotation relative to the axle, yielding packing mounted around the spindle, restraining walls for said packing, a hoop-shaped spring inclosing said packing and tending to press same inwardly and extend same laterally against said walls, and a second spring reinforcing the first spring, substantially as described.

34. In a hub odometer, the combination with a hub and an axle, of a cap mounted over the end of said hub and axle, a closed chamber within said cap having in part double walls spaced apart, a spindle journaled in said cap and extending within said chamber, a cyclometer carried by said spindle, means for restraining said spindle from rotation relative to said axle, and actuating means for said cyclometer carried on the inner wall of said closed chamber, substantially as described.

35. In a hub odometer, the combination with an axle and a hub, of a cap mounted over the end of said hub and axle, the said cap being formed in part of transparent material, a spindle journaled in said cap, a cyclometer carried by said spindle, and means for restraining the spindle against free rotation relative to the axle, substantially as described.

36. In a hub odometer, the combination with a hub and an axle, of a cap mounted over the end of said hub and axle, a closed chamber in said cap, a portion of the outer wall of said closed chamber being made of transparent material, a spindle journaled in said cap and extending into said chamber, a cyclometer carried by said spindle within said chamber, and means for restraining the spindle against free rotation relative to said axle, substantially as described.

In testimony whereof, I affix my signature, in presence of two witnesses.

HARRY P. C. BROWNE.

Witnesses:
WILLIAM H. PALMER, Jr.,
MOSES ELY.